United States Patent Office 3,047,353
Patented July 31, 1962

3,047,353
OIL-IN-WATER EMULSIONS
Arthur F. Klein, Holland, Pa., assignor to American Cyanamid Company, New York, N.Y., a corporation of Maine
No Drawing. Filed Feb. 11, 1960, Ser. No. 7,974
12 Claims. (Cl. 8—86)

This invention relates to novel oil-in-water emulsion vehicles for carrying pigments or dyes. More especially it is concerned with colored compositions and coloring processes using such compositions. As such this application constitutes a continuation-in-part of my copending application Serial No. 661,995, filed May 28, 1957, now abandoned.

Dispersions of colors are used in many coloring processes. In some cases, the color is in solution. In others, particularly in printing, the color, frequently in a more or less insoluble form, is incorporated in a more viscous vehicle, usually called a "paste." One of the earliest types of such pastes, and still very commonly used, was formed with various carbohydrate gums.

Despite their long continued use, such carbohydrate pastes have many disadvantages. Often they do not keep. In some cases they are rapidly thinned by certain frequently used materials such as stabilized diazonium compounds. After coloring a fabric, it is necessary in many cases to wash out the ingredients of the vehicle. Otherwise, the resultant colored material may be bodied or sized and lose some of its desirable softness of hand. Unfortunately, such washing also results in wasteful removal of color and loss in brilliance and strength of the design or shade.

One marked advance in this art is described in U.S. Patent No. 2,597,281. It discloses the use of certain oil-in-water emulsions as vehicles for coloring with certain vat dyes. The present invention is primarily concerned with improved oil-in-water, emulsion-type vehicles, in color-containing compositions thereof and in methods of coloring therewith.

Forming any oil-in-water emulsion vehicle requires the use of an emulsifier. In the above-noted patent, various lignin sulfonates were found essential. For many purposes the resulting compositions are very satisfactory, particularly in coloring with many vat dyes. However, they have definite limitations. Lignin sulfonates often add undesirable color to the emulsion. Emulsions formed with lignin sulfonates are not stable with many coloring matters commonly used in printing. Illustratively, for example, certain sulfonic half esters of leuco vat dyes and various frequently encountered combinations of stabilized diazo compounds and coupling components break such emulsions.

Any good, general-purpose vehicle for printing and dyeing should meet certain definite requirements. To meet these requirements, emulsion-type vehicles must qualify with the following eight criteria.

(1) Economy; it should be capable of economical preparation.
(2) Reproduceability; it must be easily prepared and give duplicate viscosities from batch to batch.
(3) Utility; it should be useful for applying color or, as in discharge printing, the chemicals necessary to remove color.
(4) Non-foaming; it should produce a minimum amount of foam or be stable to commercial anti-foaming agents such as octyl alcohol and the like.
(5) Stability; the emulsion itself must not break for at least 24 hours on standing without agitation.
(6) Resistance to breaking; it must be resistant to breakdown in the presence of normally-encountered organic solvents and/or such electrolytes as commonly-used acids, alkalis and salts.
(7) Non-colored; it should be creamy white as contrasted with the darker emulsions obtained using lignin sulfonates.
(8) Adaptability; it should be especially resistant to breaking by substantially any commonly-used dyes and any chemicals necessary to develop the dye during subsequent treatment.

In general, the lignin sulfonate emulsions of the above-noted patent meet the first four criteria satisfactorily. However, they are quite inadequate with respect to the latter four, particularly the seventh and eighth. As a result, they are unsuitable for general use as color vehicles. Nor in the period since that patent was published have good, general-purpose, oil-in-water, emulsion-type vehicles been found. Accordingly, in the coloring arts there has remained an unfilled demand for oil-in-water emulsions capable of meeting these eight requirements.

In view of this long-standing need, the oil-in-water emulsions of the present invention meet all the criteria to a surprisingly high degree. They have been produced by a relatively simple but surprisingly effective modification in the composition of the vehicle and of the colored compositions obtainable therewith.

In general, this modification may be described as the substitution of different emulsifiers for the lignin sulfonates of the previously used compositions. However, in these terms the simplicity is more apparent than real. Relatively few materials were found suitable. A majority of the surface-active materials commonly employed as emulsifying agents cannot be used.

However, in order to distinguish the limited group of materials which can be used according to the present invention from those which cannot, a definition of what constitutes a "successful emulsifier" is necessary. This term as used herein means two things. First, in a test vehicle composition the emulsifier must produce an emulsion which meets the fifth of the above-listed criteria, i.e., does not separate on standing at room temperature for twenty-four hours. Second, an emulsion which passes the first test must also be stable for 24 hours after the addition thereto of a test dye.

The test vehicle composition which is used should be analagous to and typical of various compositions suitable for use in actual practice. For the purposes of the present invention, the following composition was used in evaluating the utility of an emulsifier. Using a high-speed stirrer such as the Eppenbach type, a total of 1000 grams of emulsion is prepared by:

(1) Dissolving 10 gms. of the emulsifier in a bodying agent consisting of
(2) 200 gms. of a 6% aqueous solution of carboxymethyl cellulose (HV–120–Hercules), which is further diluted with
(3) 189 gms. of water and (as an anti-foaming agent)
(4) One gm. of octyl alcohol; to which mixture is added (to form the oil phase)
(5) 600 gms. of Varsol No. 1.

Composition percentages are readable by moving the decimal point one integer to the left. The emulsifier may be dissolved in the 189 gms. of water before combining with the body agent solution if so desired.

If the resultant emulsion stands for 24 hours without breaking, some 3% by weight of a test dye is added. As the test dye, an azoic dye commonly used in printing fabrics but which cannot be used in the compositions of the above-noted patent was employed. In this discussion, the test dye selected was C.I. Azoic Red No. 1 powder. C.I. Azoic Red No. 1 is defined in the new Color Index (Vol. 2), p. 2641, as C.I. 37558 mixed with diazotized and stabilized C.I. 37090. C.I. 37558 is Azoic Coupling Component 14 (chemically the orthophenetidide of 3-hydroxy-2-napthol). C.I. 37090 is Azoic Diazoic Component 32 chemically (5-chlorotoluidine hydrochloride).

Since this well known dye is usually applied to fabrics from a composition containing less than 3% (97% vehicle), 3% was selected as the test quantity. If the emulsion containing 3% of the Azoic Red No. 1 powder stands for 24 hours without breaking the emulsifier is considered satisfactory. In most cases where breaking occurred, a 1.5% dye content emulsion was also prepared and allowed to stand.

On the basis of this testing composition and procedure, it was found that of the broad spectrum of materials commonly available commercially as surface-active agents, those which were found to be satisfactory in the compositions of the present invention fall within two types, certain nonionic agents and certain anionic agents.

A large number of surface-active agents is included in the present invention when set forth in these broad terms. However as to these general types there are several limitations of particular importance. Many nonionic and many anionic surface-active materials considered to be "emulsifiers" in common usage are not satisfactory for the purposes of this invention.

In the nonionic group, two general types were found that could be considered as successful. Both are polyoxyethylene derivatives.

The instant application is concerned with anionic-type of agents. Those which can be termed "satisfactory" in the present invention in accordance with the testing procedure outlined above can be described by the following formula

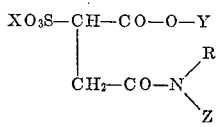

wherein X and Y are cations, either hydrogen or salt-forming radicals, R is an alkyl, alkoxyalkyl or hydroxyalkyl and Z is selected from hydrogen or

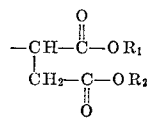

wherein $R_1$ and $R_2$ are hydrogen or alkyl. Usually $R_1$ and $R_2$ are the same. R should contain from about 12 to 20 carbon atoms and R plus $R_1$ plus $R_2$ should total from at least about 16 to about 30 carbon atoms.

As so defined, two types of sulfosuccinic acid derivatives are contemplated. One type constitutes certain of the aspartate amides of sulfosuccinic acid and its salts, described in U.S. Patent 2,438,092. The other group constitutes certain of the higher fatty acid amides of sulfosuccinic acid, described in U.S. Patent 2,252,401.

However, not all of the compounds described in these references can be used for the purposes of the present invention. As disclosed in those patents, such compounds range from those in which the carbon content is low and solubility in water is very high to those of high carbon content which are markedly less soluble. In general, only those of medium solubility and of lower carbon content than those used in the present invention are ordinarily considered effective as emulsifiers. Those of higher carbon content are used to break highly-stable, oil-in-water emulsions such as those encountered in the petroleum industry, and are so stable as to be frequently called "permanent" emulsions. Surprisingly, only those usually considered of such high carbon content as to constitute emulsion breakers rather than emulsifiers are found useful in the present invention.

In general, coloring of fabrics or fibers with emulsions of this invention may be effected in two ways. In one, an emulsion is prepared containing either the desired amount of coloring matter or the components necessary to produce it. If desired, it may contain also other chemicals necessary for the coloring process, as for example an alkali and a reducing agent in the case of vat-dye printing.

Alternatively, a clear emulsion of satisfactory viscosity is made in which there is no coloring matter present and the dyer adds thereto in the desired amount, coloring matter, either in the form of a solution, a paste or other type of dispersion. The fact that it is not initially necessary to make up the final colored emulsion is of great practical importance. The dyer or printer may purchase either the clear emulsion or make it up himself as a stock emulsion. He may then add to it the amounts of coloring matter called for by the requirements of the final colored fabric or fiber.

Colored oil-in-water emulsions can be used on any fibrous material which can be dyed or colored. Thus, the natural cellulose fibers, such as cotton, linen, jute, paper, etc., are satisfactorily colored as are synthetic fibers, such as regenerated cellulose and cellulose acetate. Basic nitrogenous fibers are also dyeable; both natural protein fibers such as wool and silk; and synthetic fibers such as those from corn protein, peanut protein or casein; and also the group of superpolyamides such as nylon. Other purely synthetic fibers such as acrylic polymers and copolymers, and other vinyl copolymers are also colorable. It should be noted that, since the colored emulsions of the present invention are stable to sulfuric half esters of leuco vat dyes, a method of dyeing or printing on basic nitrogenous fibers with vat dyes becomes possible, which constitutes an important advance as the ordinary vat dyeing procedures with the requisite high degree of alkalinity are unsuitable for most basic nitrogenous fibers which are alkali sensitive. It is true that where stable emulsions of sulfuric half esters of leuco vat dyes can be made with lignin sulfonates, these present the same advantage. However, as has been pointed out above, with many such solubilized vat dyes these emulsions are not stable, whereas the emulsions of the present invention are stable and thus make available for the dyeing of basic nitrogenous fibers many dyes which could not be used practically before in oil-in-water emulsion systems.

The emulsions of the present invention are characterized by the same flexibility as are other emulsions, namely a wide range of viscosities by changing the ratio of oil to water, or, if so desired, by the possibility of increasing the viscosity of an emulsion by adding water-soluble thickener. In addition, the emulsions of the present invention are applicable to all types of dyes whereas, as has been pointed out above, some classes of dyes or even individual dyes within a class, cause instability of emulsions prepared with other emulsifiers.

The method of coloring varies with the type of coloring matter used. Certain coloring matters such as acid dyes, direct dyes, cellulose acetate dyes and the like, are applied in the emulsion and are substantive to the fibers used; that is to say they become bound to the fiber either by chemical reaction, such as acid or metalized dyes with basic nitrogenous fibers, or other chemical forces such as direct dyes for cotton and the like, and finally by solution or partial solution in the fiber, as in the case of many cellulose acetate dyes.

With these types of dyestuffs, the application is with a single emulsion in which the coloring matter is about the only added chemical. It is only necessary to use an emulsion of the proper viscosity, low viscosity being employed where an overall or solid color is desired and a higher viscosity where design is to be printed and where the printed design must not run or bleed until the color has been firmly affixed to the fiber.

Another type of coloring is presented by dyes such as vat dyes, sulfur dyes, azoics and the like which may be considered loosely as dyes which have to be developed; that is to say there is applied to the fiber not the final color but a different form thereof or components which react to form the final color. The first case is represented by vat dyes and sulfur dyes which have to be applied and then treated to change their form. In the case of ordinary vat dyes, this will require chemicals in the emulsion which reduce the dye so that it becomes substantive to the fiber and it is then reoxidized by air or chemicals to its insoluble form. In the case of sulfur dyes, soluble vats and the like, the dye is applied in the form in which it is substantive for the fiber and is then transformed into the final form by after-treatment. Another type of developed dye is the azoic coloring matter in which the diazo component is stabilized against azoic coupling and coupling does not take place until suitable after-treatment is used. In this case all the components of the coloring are present but have not yet reacted. It is with some of the developable dyes that the present invention presents its greatest advantages over the prior art because, as has been pointed out above, certain of such coloring compositions break an emulsion formed with the lignin sulfonates, whereas the emulsions of the present invention are stable.

The amount of emulsifying agent used in preparing the compositions of the present invention is not critical. In general, optimum results are obtained with about 1–2% of the total weight of the emulsion. This, however, will vary with the viscosity of the emulsion, with the chemicals added to it, and with the technique of use.

The basic oil-in-water emulsion-type vehicle of this invention is comprised essentially of the water, the oil, usually a hydrocarbon oil, and the emulsifying agent. However, other ingredients may be present, for example the outer water phase may contain hydrotropic or other hydrophilic material to withstand a high-salts content when the latter is desirable. Usually the essential thickener is the oil, however as noted above, it is an advantage of the present invention that other compatible, water-soluble thickeners may be present as well as miscellaneous ingredients introduced with and for the color-material.

The proportions of the inner or disperse oil phase can vary over an enormous range, from as low as 15% to as much as 80%. Essentially, the oil content determines the viscosity or body of the final emulsion and, as has been pointed out above, this will vary greatly depending on whether the coloring process to be used is one producing an overall coloring or is a printing process in which a design is applied to a portion of a fabric. Of course, if the concentrated emulsion is diluted with large amounts of water to make a dye bath, the above percentages are correspondingly reduced.

The chemical composition of the oil used is also not critical. In general it should be inert and not adversely affect either the coloring matter, the added chemicals or the fiber. For practical purposes, hydrocarbon oil, such as petroleum fractions, are the ones to be used. They are cheap, inert and available in a very wide range of viscosities and boiling points. For purposes of the present invention it does not make a great deal of difference whether the hydrocarbon is predominantly aliphatic or predominantly aromatic. However, since the former type is usually cheaper and is thoroughly satisfactory, it is ordinarily preferred.

It is desirable that there be no significant evaporation of the oil phase and very low-boiling hydrocarbons are therefore not desirable. However, no exact limit of boiling point is vital and the commonly available oils having upper boiling point ranges reaching 300–400° C. for their mixed volatile constituents are satisfactory. Lower boiling range hydrocarbons can be used as it is really the boiling point of the low-boiling constituents which sets the limit. Viscosity of the oil is also not critical. In general, it should be fairly low. Viscosities of 5 centipoises or less are desirable. A thin emulsion for dyeing is desired. When, however, the emulsion is to be used as a printing paste, more viscous emulsions are desirable and those having a viscosity range from 20–60 poises are satisfactory, though for shallow fine-grain printing rolls, the viscosity may be 10 poises or even less.

Especially when some hydrophilic or hydrotropic material is added to the aqueous phase, some foaming may result. With large equipment some foaming is normally not objectionable. However, if the equipment is to be used to its limit, it is sometimes desirable to add a very small amount of an anti-foaming agent, for example about 0.1% may be used, and any suitable anti-foamer, such as octyl alcohol, is satisfactory.

When the colored emulsions are to be applied to the fabric to give a solid color (dyeing rather than printing), there are several general methods which may be used. If the color is not to be formed in situ or if it is feasible to incorporate all the necessary chemicals in the emulsion, a simple padding of the emulsion on to the fibrous material may be used when the latter is a fabric, or package dyeing methods may be used where the material is a yarn. The dyed fabric and yarn may then be dried and, when necessary, subjected to the conditions required to form the final color. In some applications the dyed fabric or yarn may be processed further without drying. Instead of padding a fabric, it is of course also possible to spray on the emulsion.

Another method of applying overall colors is by a blotch roll. In each case the emulsions will be of relatively low viscosity so that a uniform and level dyeing results. The conventional after-treatment, such as soaping and the like, are not adversely affected by the use of emulsions of the present invention.

Another method applicable with developable colors is to apply one component in the form of the emulsion and then pass the material through a bath containing the other component.

Where printing is used, the emulsion will be much thicker as the design is applied from a suitable printing roll and must not bleed or wander in order to avoid a commercially unacceptable print. Also, the consistency of the emulsion must be sufficiently stiff so that after the engraved portion of the printing roll passes the doctor blade the depression in the roll remain full.

To illustrate the fact that many typical anionic surface-active agents often used as emulsifying agents, including among others those of the lignin sulfonate class, as well as most of those of sulfosuccinic acid derivative class set forth in the above-noted references are not "satisfactory" emulsions in this invention, a number of test emulsions were prepared according to the procedure outlined above. A variety of illustrative anionic materials were tested therein. These included the following materials known as surface-active agents or mixtures:

(1) A commercially available mixture comprising some 25–30% sodium lignosulfonates and 70–75% of sugar degradation products,
(2) Sodium diamylsulfosuccinic acid,
(3) Sodium dioctylsulfosuccinic acid,
(4) A commercially-available purified calcium lignosulfonate,
(5) A commercially-available purified and partially desulfonated sodium lignosulfonate,
(6) A commercially-available mixture of (4) and (5) containing sugar degradation products,
(7) A sulfonated fatty acid commercially-available as Prestabit Oil V,
(8) Disodium-disulfodinaphthyl methane,
(9) An alkyl aryl sulfonate agent commercially available as Nacconal NR,
(10) Bis (2-ethylhexyl) disodium sulfosuccinamate, and

(11) An ammonium salt of a sulfonated long chain fatty acid ester.

They also included a number of compounds according to the general formula above in which X, Y, Z, R, $R_1$ and $R_2$ have the following values:

| | X | Y | Z | Number of carbon atoms | | |
|---|---|---|---|---|---|---|
| | | | | R | $R_1$ | $R_2$ |
| (12) | Na | Na | H | 12 | H | H |
| (13) | Na | Na | H | 12 | 2 | 2 |
| (14) | H | H | G | 12 | 2 | 2 |
| (15) | Na | Na | H | 10 | 2 | 2 |
| (16) | Na | Na | H | 18 | H | H |
| (17) | Na | Na | H | 12 | 4 | 4 |
| (18) | Na | Na | H | 18 | 2 | 2 |
| (19) | Na | Na | H | 18 | 1 | 1 |
| (20) | Na | Na | H | 18 | 4 | 4 |
| (21) | Na | Na | H | 18 | 5 | 5 |
| (22) | Na | Na | H | 18 | 6 | 6 |

Numbers 1–3 and the like materials would not produce stable, creamy-white emulsions as defined above; Numbers 4–10 and the like materials produced emulsions stable per se but which broke after adding the test dye; Numbers 11–14 and the like produced emulsions stable in the presence of 1.5% of test dye; and only those such as Numbers 15–22 gave emulsions stable after addition of 3% or more of the test dye.

These results, which are given as typical illustrations only, do point up the importance of the limitations set forth above in conjunction with the generic formulae. In general, variations in X, Y and Z are of minor importance as compared with the effect of varying the R, the $R_1$ and the $R_2$ substituents.

The R substituent in particular is very important. It must contain at least about 12 carbon atoms to produce satisfactory general-purpose vehicles. Moreover, the total number of carbon atoms in the three R substituents is important. If R contains less than about twelve carbons or the total in the three "R's" is less than about 16 carbon atoms, emulsions may be produced which may be stable per se but break in the presence of the full 3% of the test dye. A minimum total of about eighteen is preferable.

Both minimums must be observed. In those cases where the total carbon content of the R's is low, as for example, when Z is hydrogen or where $R_1$ and/or $R_2$ are hydrogen or methyl, R should contain more than the minimum content of twelve carbons which is permissible when the $R_1$ and $R_2$ substituents are sufficient to establish a minimum of sixteen or eighteen. Adding carbon atoms as X or Y substituents is not particularly useful.

As a practical matter, 18 carbon atoms in R represents about the upper useful limit. $R_1$ and $R_2$ may in carbon atom content vary from one to about six. Thus when R contains about 18 carbon atoms and $R_1$ and $R_2$ each contain six, a practical upper limit to the total carbons in the three "R's" of about 30 is reached.

The invention will be more fully illustrated in conjunction with the following examples which illustrate the applicability of the vehicles of this invention with a wide variety of color materials. In the examples particular emulsions have been described. It should be understood, however, that in actual practice it is not necessary to use a single emulsion. On the contrary, mixtures of emulsions can be used with the same effect.

Since methods of application and the composition of the necessary color-carrying emulsions vary with different classes of dyes, the examples are grouped under certain headings. In these examples all parts are by weight unless otherwise specified.

APPLICATION OF DIRECT DYES

In the present specification the term "direct dyes" is applied to any dyes which are substantive to cellulosic material. In this class of dyes the colored portion of the molecule is the anion.

Example 1

A clear emulsion is prepared by stirring together 261 parts of water and 10 parts of N-octadecyl-N-disodium succino disodium sulfosuccinamate. When all of the sulfosuccinamate is dissolved, the mixture is intensively mixed with the slow addition of 729 parts of a petroleum hydrocarbon oil having approximately 15% aromatics, 5% olefins and 80% saturated hydrocarbons. Such an oil is typically sold in the trade under the designation of Varsol No. 1. After all of the oil has been added, a creamy white emulsion results.

If it is desired to prevent foaming, 1 part of the water may be replaced by 1 part of octyl alcohol. The stability and other characteristics of the emulsion are not affected.

Example 2

2 parts of a dye mixture consisting of 28% of a dye having C.I. No. 593 and 72% of the dye having C.I. No. 346 and 10 parts of urea are dissolved in 13 parts of hot water. The solution is then stirred into 75 parts of either of the emulsion clears as prepared in Example 1. Stable colored emulsions are obtained.

Example 3

The colored emulsions of Example 2 were printed on cotton cloth and dried. A portion was then aged for 10 minutes in a steam ager and another portion steamed for 45 minutes at 6 lbs. p.s.i. Both pieces were then rinsed in cold water and a portion of each after-treated with a 1% solution of a dye fixing agent, cationic resinous compound, at 49° C., rinsed and dried. The same procedure was repeated on spun rayon fabric.

In each case prints of excellent color values were obtained, showing that pressure steam ageing was not necessary. The after-treatment with the dye fixing agent in each case somewhat improved fastness properties, as was to be expected.

Example 4

The effect of varying proportions of emulsion ingredients was examined. For brevity, the emulsifying agent will be designated E.A. Four emulsions prepared as in Example 1 had the following ingredients:

[Parts]

| | | | | |
|---|---|---|---|---|
| Water | 190 | 340 | 340 | 340 |
| E.A. | 20 | 5 | 10 | 20 |
| Oil | 790 | 655 | 650 | 640 |

Four more emulsion clears were prepared with the same proportions except that 1 part of water was replaced by 1 part of octyl alcohol. This reduced foaming in preparation but did not otherwise affect the characteristics of the emulsions.

16 parts of the direct dye mixture of Example 2 and 80 parts of urea were dissolved in 104 parts of hot water. 25 parts of the resulting dye solution were then added to 75 parts of each of the above emulsion clears to form colored emulsions which were then printed on cotton and spun rayon as described in Example 3.

Excellent prints were obtained in each case. As in Example 3, no difference was noted between the two ageing procedures, showing that high-pressure steam ageing is not necessary.

When portions of the above prints were after-treated with a dye fixing agent, somewhat improved fastness resulted as is described in Example 3.

Example 5

The procedure of Example 4 was repeated with corresponding amounts of dyes having the following C.I. Nos.: 382, 420, 518, 620 and 621. In each case excellent penetration and good prints were obtained with each of the emulsion clears.

*Example 6*

The procedure of Examples 4 and 5 was repeated, replacing the emulsifying agent with N-dodecyl-N-disodium succinyl disodium sulfosuccinamate. The emulsions formed were white and stable, and the prints were of high quality.

*Example 7*

The procedure of Example 6 was repeated, using N-hexadecyl-N-disodium succinyl disodium sulfosuccinamate in place of the emulsifying agent of the preceding example. The emulsion clears were stable and white, and the colored emulsions gave prints of excellent quality, substantially indistinguishable from those of the preceding examples.

*Example 8*

The procedure of Example 5 was repeated, using the guanidine salt instead of the corresponding sodium salt. A stable emulsion clear was obtained from which colored emulsions were prepared and gave excellent prints.

*Example 9*

The procedure of Example 7 was repeated, using as emulsifying agent bis(2-ethylhexyl)disodium sulfosuccinamate. A good emulsion clear was obtained which had high stability, and prints from colored emulsions were of high quality.

*Example 10*

The procedure of the preceding example was repeated, using 3 of the emulsifying agents; namely disodium-N-(dimethyl - 1,2 - dicarboxyethyl) - N - octadecyl sulfosuccinamate, disodium - N - (diamyl - 1,2 - dicarboxyethyl)-N-octadecyl sulfosuccinamate, and disodium-N-(dibutyl-1,2 - dicarboxyethyl) - N - octadecyl sulfosuccinamate. In each case a good white emulsion clear was produced which was stable, and prints made from colored emulsions thereof were of good quality.

*Example 11*

The procedure of Example 10 was repeated, using as the emulsifying agent N-octadecyl disodium sulfosuccinamate. Excellent emulsions of high stability were obtained which are substantially the same as those of Example 1. When colored emulsions were prepared, prints of high quality on cellulosic material resulted.

*Example 12*

Some printers have equipment that is not well suited to the use of emulsions in which the oil phase is the only bodying constituent and so are unable to obtain the maximum quality of softness of material. For such operations a small amount, for example 1–2%, of a bodying material is useful. An emulsion was therefore prepared by mixing 400 parts of a 3% aqueous solution of a sodium alginate with 10 parts of the emulsifying agent of Example 1. This was then emulsified in a high-speed mixing device of the shearing type with 590 parts of the oil, Varsol No. 1, used in Example 1. A white emulsion of excellent stability was obtained.

Similar high quality emulsions were obtained when the sodium alginate solution was replaced with 400 parts of a 5% aqueous solution of a starch-ether thickener or gum tragacanth, or 400 parts of a 3% solution of carboxymethyl cellulose. Finally, an emulsion was prepared using 400 parts of a 2% aqueous solution of mannogalactan.

*Example 13*

The procedure of Example 2 was repeated, replacing the emulsion clears of Example 1 with the emulsion clears of Example 12. Prints were then made by the process of Example 3 on nylon, bright rayon, delustered rayon, cotton and spun nylon. Prints were made both with fine line rollers and blotch rollers. In the case of the fine line prints, the quality was slightly superior to that obtained from the emulsion clears of Example 1, particularly the emulsion containing mannogalactan. On the blotch prints there was no difference.

The same results are obtained as above with each of the following dyes having C.I. Nos. 326, 406, 581 and 622.

*Example 14*

The following emulsions were prepared using:

[Parts]

| | | | | |
|---|---|---|---|---|
| Water | 121 | 240 | 210 | 110 |
| High viscosity carboxymethyl cellulose (5% solution) | 200 | 200 | 300 | 400 |
| Octyl alcohol | | | 1 | 1 |
| E.A. of Example 1 | 10 | 10 | 5 | 5 |
| Solvent | 669 | 550 | 484 | 484 |

The emulsions were all stable, white emulsions of good quality.

A similar set of emulsions were then prepared, replacing the emulsifying agent of Example 1 with that of Example 11. These emulsions were in all cases equal to, or slightly superior than, the first four emulsions.

*Example 15*

Colored emulsions were prepared from the 8 emulsion clears of the preceding example by adding to 75 parts of the emulsion clear 25 parts of a dye composition prepared with 2 parts of direct dye and 10 parts of urea dissolved in 13 parts of hot water. Five direct dyes were used; namely C.I. Nos. 382, 420, 518, 620 and 622, making a total of 40 colored emulsions. Each of the 40 emulsions were divided into a number of portions, one portion of each being applied to cotton by padding, another to spun nylon by padding, and two others to cotton by screen- and by roller-printing, respectively. The dyed and printed materials were then dried. Part of each colored sample was aged in a steam ager at 103° C. for 10 minutes and another part steamed at 5 lbs. p.s.i. for 45 minutes. They were then rinsed, after-treated with the dye fixing agent as described in connection with Example 2, rinsed and dried. In every case an excellent dyeing resulted.

An unexpected advantage was observed in the case of screen printing as samples of the screen print were immediately over-printed with a second color, which proceeded satisfactorily without picking off any of the first color. This immediate over-printing permits an increase in the speed of screen printing of multiple prints of from 50–75% as it is unnecessary for the printer to wait until the first print dries. Also the emulsions were easier to push through the screen.

AZOIC COLORS

The colors referred to in the examples of this section are azo dyes formed in the fiber by reaction of a diazo component and a coupling component. As pointed out above, this may be effected by padding the cloth with the coupling component, drying, followed by padding or printing with the diazotized base suspended in an oil-in-water emulsion of the present invention. Because of the instability of the diazotized bases unless the temperature is kept very low, it is common to use diazo amino compounds in which the diazotized component is reacted with an amino acid such as sarcosine, alkyl glycine, allyl glycine, 4-sulfoanthranilic acid or the like. These diazo amino compounds do not couple azoically until acidified, preferably in an acid ager. The diazo amino compounds can be applied in emulsions.

*Example 16*

160 parts of a commercial dye powder comprising diazotized 5-chloro-2-aminotoluene stabilized with 4-sulfo-anthranilic acid and an equivalent amount of a coupling component, ortho-phenetidide of beta-oxynaphthoic acid, were mixed with 160 parts of urea and dissolved in 616 parts of water containing 64 parts of 30° Bé. sodium hydroxide.

25 parts of the dye solution was then mixed with 75 parts of each of the emulsion clears described in Examples 1, 4, 7, 10, 11, 12 and 14. Stable colored emulsions produced as above were applied to cotton and viscos rayon fabrics by roller printing, the print dried, acid aged for 5 minutes at 103° C., rinsed, soaped at 71° C., again rinsed and dried. Excellent shades of prints were obtained, particularly with the emulsion clears of Example 12 in which gum tragacanth, carboxymethyl cellulose or mannogalactan was used.

When the foregoing procedure was applied using lignin sulfonates as an emulsifying agent, the emulsions were unsable and were not practically usable.

*Example 17*

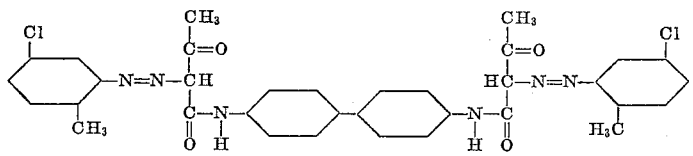

A solution was prepared as in the preceding examples, replacing the diazo with a corresponding amount of the stabilized diazo of 5-chloro-o-toluidine and the coupling component 4,4'-bi-o-acetoacetotoluidide. Colored emulsions were prepared as described in the preceding examples, using emulsion clears of Example 4 and Example 12, the latter with bodying agents, gum tragacanth or carboxymethyl cellulose. Printing was carried out on cotton and viscose rayon. The colored emulsions showed excellent stability and gave good prints.

*Example 18*

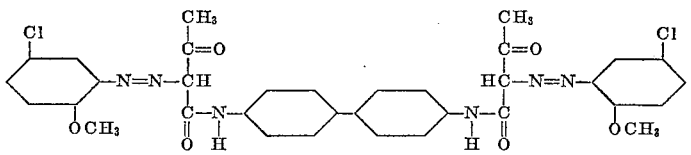

The procedure of Example 17 was followed except that the stabilized diazo of 5-chloro-o-anisidine and the coupling component 4,4'-bi-o-acetoacetotoluidide was used. Colored emulsions of excellent stability resulted which were printed on cotton and viscose rayon by both roller and screen printing. In both cases the prints were of satisfactory quality.

Similar emulsions were made with the following dyes:

The stabilized diazo of 5-chloro-o-toluidine and the coupling component of 3-hydroxy-2-naphtho-o-phenetidide.

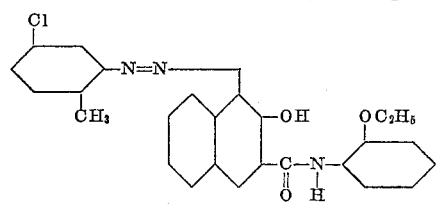

The stabilized diazo of 5-chloro-o-anisidine and the coupling component of 3-hydroxy-2-naphtho-o-anisidide.

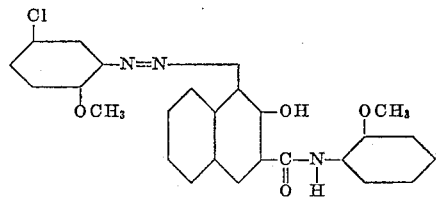

The stabilized diazo of 5-chloro-o-toluidine and the coupling component of 3-hydroxy-2-naphtho-o-toluidide.

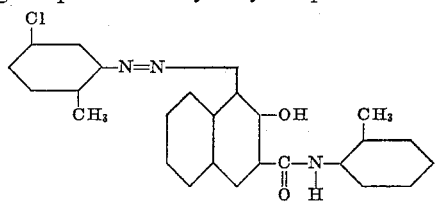

The stabilized diazo of 4-chloro-o-toluidine and the coupling component 3-hydroxy-2-naphtho-o-toluidide.

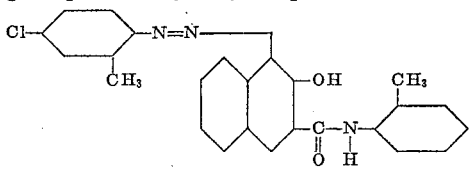

The stabilized tetrazo of 3,3'-dimethoxybenzidine and the coupling component 3-hydroxy-2-naphthanilide.

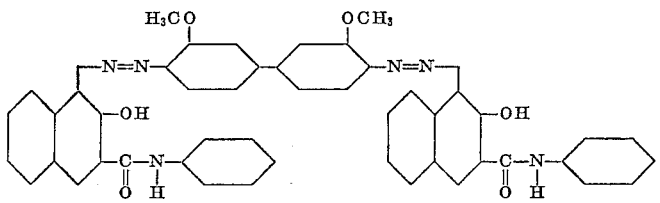

The emulsions were stable and gave excellent prints.

*Example 19*

8 oz. of a solution described in Example 18 were added to one gallon of an oil-in-water emulsion prepared as follows: 11 parts of high viscosity carboxymethyl cellulose powder were slowly stirred in 434 parts of water and when hydration was complete 9 parts of the E.A. of Example 11 and 4 parts of 30° Bé. sodium hydroxide were added in that order. The mixture was then emulsified in a high-speed emulsifier with shearing action, adding 542 parts of the oil described in Example 1, producing a creamy white emulsion of good stability. The colored emulsion obtained were printed on cotton fabrics and gave prints of excellent fastness, superior to those obtained with printing pastes using starch thickeners.

Good results were obtained with emulsions containing the same quantity of the other dyes desecribed in Example 18. The prints all showed high quality and were superior to prints from ordinary carbohydrate pastes.

ACID, CHROME, AND PREMETALIZED DYES

These dyes have the common characteristic that the color is in the anion of the molecule and react with basic nitrogenous fibers such as wool, silk, nylon, etc. They are also useful in the dyeing of acrylic fibers, especially where the acrylic fiber is a copolymer, including monomers, which have basic groups.

Example 20

3 parts of a milling dye, C.I. No. 735, and 3 parts of a thiourea are added to 24 parts of hot water with stirring. 30 parts of this solution are then stirred into 70 parts of any of the emulsion clears described in the preceding Examples 1, 4, 7, 8, 10, 11, 12 and 14. The resulting printing paste was used for printing both by roller and screen printing on nylon, wool, silk and an acrylic copolymer including vinyl pyridine. After printing, the fabrics were dried, aged 10 minutes in a steam ager at 103° C., rinsed in cold water, soaped for 5 minutes at 38° C., rinsed and dried. Excellent prints were obtained in each case. Especially superior results in the roller prints were from the bodied emulsions of Example 12 containing mannogalactan, starch ether or carboxymethyl cellulose. In the case of the screen printing, the best color values were obtained with the emulsions made from the emulsion clears containing the above bodying agents. Printing was faster, however, and the screen could be removed more rapidly than with the customary starch or dextrin thickeners.

Example 21

The procedure of the foregoing example was repeated with each of three dyes C.I. Nos. 275, 733 and 1088. The same excellent prints were obtained and, as in the preceding example, the emulsions containing additional thickening or bodying agents gave somewhat superior results in roller printing, whereas the best results in screen printing were obtained with the emulsions containing a lower quantity of the bodying materials.

Example 22

The following formulation was prepared:

2 parts chrome dye C.I. 720
6 parts urea
5 parts furfuryl alcohol
2 parts ammonium thiocyanate
8 parts hot water
1 part chromium chloride
75 parts of each of the emulsion clears of the preceding example
1 part ammonium hydroxide conc.

The preparation is effected by blending the chrome dye and urea and then making a paste with the furfuryl alcohol. After this, the ammonium thiocyanate and hot water are added to form a solution. To this solution the chromium chloride is added and finally the resulting solution is stirred into each emulsion clear, after which the ammonium hydroxide is added.

The colored emulsions produced were then dyed on wool, silk and an acrylonitrile copolymer containing vinyl pyridine by roller printing, by screen printing and by padding to give a solid shade. In each case the colored material was dried, steamed for 10 minutes in a steam ager, rinsed for 5 minutes at 38° C., soaped at the same temperature, rinsed and then again dried. Excellent prints were obtained in each case with good fastness.

A portion of each print was steamed for 1 hour. Only a very slightly inferior print was obtained.

Other chromable dyes which give excellent results by the above methods are those having C.I. Nos. 36, 169, 201, 202, 343 and 1085.

Example 23

The procedure of Example 22 is repeated, using the chromium complex of the azo dyes obtained by coupling diazotized 1-amino-2-hydroxynaphthalene-4-sulfonic acid to 1-hydroxynaphthalene-8-sulfonic acid. Excellent prints were obtained.

By the same procedure the chromium complex of the azo dye obtained by coupling diazotized 1-amino-2-hydroxynaphthalene-4-sulfonic acid to 1-phenyl-3-methyl-5-pyrazolone. The prints showed the good qualities of those described above.

DISPERSE DYES

These dyes are water-insoluble dyes mainly derived from aminoanthraquinone derivatives, basic azo compounds, and other basic substances and are used to color fibrous materials in which the dyes have some solubility or affinity. The dyes are sometimes referred to as "acetate dyes" because of their extensive use with cellulose acetate.

Example 24

2 parts of the dye having the following formula

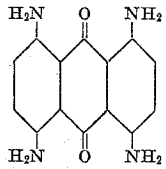

were dispersed in 13 parts of hot water. 10 parts of diethylene glycol were then added and the resulting solution stirred into 70 parts of an emulsion clear of Example 4, Example 12 and Example 14. The colored emulsions resulting were then printed on to cellulose acetate, nylon, polyglycol terephthalate, acrylonitrile homopolymer, acrylonitrile copolymer including vinyl pyridine, and acrylonitrile vinyl acetate copolymer.

Both roller printing and screen printing was used with separate portions. In each case after applying the color the fabric was dried, aged for 10 minutes at 103° C., rinsed in cold water, soaped for 1 minute at 38° C., rinsed and dried. Bright sharp prints were obtained in each case, the printed fabrics were very soft, and the fastness properties were equal or superior to prints by conventional methods.

The above procedure was repeated with an emulsion using a lignin sulfonate as the emulsifying agent but the emulsion was unstable and could not be printed.

Example 25

The procedure of Example 24 was repeated with each of the following dyes:

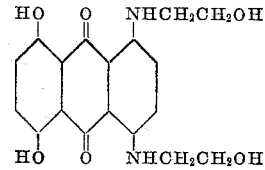

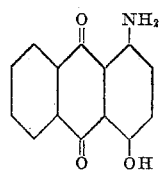

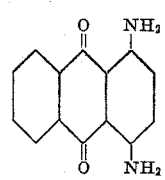

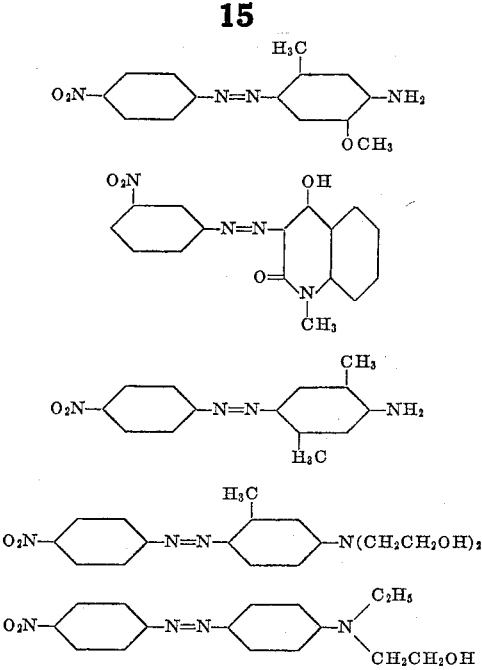

Excellent prints were obtained in each case, being bright and sharp and of good fastness. The printed fabrics also showed the desirable softness as in the case of the preceding example.

BASIC DYES

Basic dyes have the color in the cation of the molecule. Usually this part of the molecules contain amino groups which may be alkylated. Dye baths are normally prepared by forming water-soluble salts or double salts. Basic dyes have a direct affinity for silk, wool, nylon, casein or acrylic fibers and some are also substantive to cellulose acetate. When dyeing cellulosic fibers, however, a mordant such as tannic acid is used.

Example 26

A solution is prepared by blending 0.25 part of the red dye C.I. No. 749 and 2.5 parts of urea and 2.5 parts of diethylene glycol and 18.75 parts of hot water. A colored dye solution is produced and is added to 75 parts of any of the emulsion clears of Examples 1, 4, 7, 8, 10, 11, 12 and 14. 1 part of diammonium phosphate is added to the emulsion to bring it up to 100 parts.

The colored emulsion from the above example was printed on to nylon, silk, wool and dry-spun acrylonitrile homopolymer fabrics, respectively. The prints were of excellent quality.

Example 27

A colored emulsion is prepared from the same dye solution with 75 parts of any of the emulsion clears of the previous example and 1 part of diammonium phosphate together with 20 parts of trimethyl trimethylol melamine (80% solids) and 4 parts of a 25% ammonium sulfate solution.

The above colored emulsions gave excellent prints when printed on the fabrics described in Example 26.

Example 28

The colored emulsions of Example 27 were printed on cotton, spun nylon, silk, filament nylon, cellulose acetate and dry-spun acrylonitrile homopolymer. Each print was aged 10 minutes at 100° C., rinsed in cold water, soaped for 1 minute at 38° C., rinsed and dried.

The prints were of high quality, the resin acting as a mordant.

Example 29

The procedure of the foregoing examples was repeated with the following dyes having C.I. Nos. 332, 662, 677, 680, 681, 682, 729 and 749. Excellent prints were obtained in each case.

DEVELOPABLE DYES, VATS

The vat dyes are insoluble in their quinone or oxo-form. They behave as organic pigments and have little or no affinity for fibrous materials. They are applied to the fiber either in the pigment form together with reducing agents and alkali or in the already-reduced form. In each case, after the reduced form of the dye has penetrated the fiber, it is reoxidized in situ. In the case of prints, the alkali and reducing agents, usually formaldehyde sulfoxylate, are applied at the same time in the printing paste. In cases where the fabric is to be dyed a solid color, only the insoluble dye is applied by emulsion, the fabric is dried and then passed through an aqueous bath containing alkali and reducing agent and through a steam chamber to promote the reduction.

The so-called Pad-Jig method may also be employed by applying the insoluble dye in the emulsion in a padder, drying the padded fabric and then passing it several times through an aqueous bath containing alkali and reducing agent to promote the reduction.

In the case of yarns the emulsion containing the vat dye may be circulated through a package machine followed by circulating an aqueous solution of alkali and hydrosulfite. It is also possible to incorporate the alkali and reducing agent in the emulsion so that the package dyeing is effected in one step.

Example 30

The following emulsion clears were prepared by the methods described in Examples 1 and 2.

[Parts]

| | | | | |
|---|---|---|---|---|
| Water | 175 | 229 | 279 | 165 |
| Octyl alcohol | | 1 | 1 | |
| E.A. of Example 1 | 30 | 20 | 10 | 30 |
| Sodium carbonate | 45 | 45 | 45 | 45 |
| Potassium carbonate | 45 | 45 | 45 | 45 |
| Sodium formaldehyde sulfoxylate | 70 | 70 | 70 | 70 |
| Cane sugar | | | | 50 |
| Varsol No. 1 | 635 | 590 | 550 | 595 |

Example 31

A series of bodied emulsion clears were prepared as follows:

[Parts]

| | | | | | | | | |
|---|---|---|---|---|---|---|---|---|
| Water | 163 | 163 | 163 | 163 | 175 | 175 | 175 | 175 |
| 5% high viscosity 120 carboxymethyl cellulose soln. | 167 | | | | | | | |
| 3% sodium alginate soln. | | 167 | | | 83 | | | |
| 5% starch-ether | | | 167 | | | 83 | 83 | |
| 2% mannogalactan soln. | | | | 167 | | | | 83 |
| E.A. of Example 1 | 10 | 10 | 10 | 10 | 10 | 30 | 20 | 20 |
| Sodium carbonate | 45 | 45 | 45 | 45 | 45 | 45 | 45 | 60 |
| Potassium carbonate | 45 | 45 | 45 | 45 | 45 | 45 | 45 | 60 |
| Sodium formaldehyde sulfoxylate | 70 | 70 | 70 | 70 | 70 | 70 | 70 | 90 |
| Varsol No. 1 | 500 | 500 | 500 | 500 | 572 | 552 | 552 | 502 |

Example 32

Another series of emulsions were prepared as described in Example 31, replacing the emulsifying agent of Example 1 with the emulsifying agent of Example 11. These emulsions, as those of the preceding two examples, are stable, white, creamy products.

Example 33

A series of colored emulsions were prepared by dispersing 2–30 parts of a commercial dye paste of each of the following dyes:

6,6'-dichloro-4,4'-dimethyl-2,2'-bisthionaphthene indigo C.I. No. 1217
Equal mixture of the above dyes
C.I. No. 1096
C.I. No. 1101
C.I. No. 1161 into the emulsion clears of the preceding three examples to make 100 parts.

The series of colored emulsions were then printed on cotton and spun rayon and the print dried, aged for 5 minutes at 103° C., oxidized with a solution of sodium perborate and sodium bicarbonate solution, rinsed, soaped for 2 minutes at 100° C., rinsed and dried. The prints show superior color values to those prepared with the same amount of dyestuff in conventional paste using starch or gum thickeners. A further set of prints were made by screen printing, excellent results being obtained and the printing proceeding readily as the emulsion easily pushes through the screen. A portion of each print was then over-printed without drying and excellent results were obtained without pick-off. In the case of the prints of colored emulsions without the added bodying agents described in Examples 31 and 32, the fabric showed a maximum of softness and pliability, substantially superior to that obtained with ordinary carbohydrate printing pastes.

*Example 34*

The emulsions of Example 33 were padded on to cotton and and spun rayon fabrics, the fabric was then dried and then steam aged. Overall colors were level, strong, and the hand of the goods was good.

*Example 35*

Fabrics were dyed with direct dyes having C.I. Nos. 364, 728, 419, 533 and 518. Then a series of designs were printed with the emulsions of Examples 30–32. The fabrics were then aged, rinsed, soaped, again rinsed and dried. The emulsions containing alkali and reducing agent destroyed the direct dyes, producing a white pattern.

*Examples 36*

The procedure of Example 35 was repeated but instead of using the emulsions of Examples 30–32 for printing, the colored emulsions of Example 33 were employed. A colored pattern was produced in place of the white pattern and was sharp, clear and strong.

DEVELOPABLE COLORS, SULFUR DYES

*Example 37*

2 parts of a green dye (Prototype 65), 2 parts diethylene glycol, 2 parts of 30° Bé. caustic soda solution and 2 parts of sodium hydrosulfite were dissolved in 17 parts of hot water. To this was added 75 parts of each of the emulsion clears of Examples 30—32 to produce colored emulsions.

Each of these were then printed on cotton and spun rayon, both by roller printing methods and by screen printing methods. In each case the print was dried, aged at 103° C. for 5 minutes in the case of cotton and 10 minutes in the case of spun rayon, oxidized with sodium dichromate and acetic acid at 48° C., again rinsed and dried.

Excellent prints were obtained, the fastness properties in every case being at least equal to those of the same dye printed with ordinary printing pastes and in some instances, superior.

*Examples 38*

The procedure of Example 37 was repeated with each of the following dyes: C.I. Nos. 595, 961, 978 and 1006. The prints showed the same good fastness properties as those of the preceding example.

SOLUBLE VAT DYES

These vat dyes are the sulfuric acid half esters of leuco vat dyes and can be applied by dyeing or printing. The dyeings are normally developed with sodium nitrite and sulfuric acid by padding or on a jig. In printing, a complete composition is applied followed by drying, ageing and developing.

*Example 39*

3 parts of the sulfuric acid half ester of Vat Jade Green, C.I. No 1101, 3 parts of urea, 1 part of thiourea and 3 parts of diethylene glycol were dissolved in 14.5 parts of hot water. They were then made into colored emulsions with each of the emulsion clears of Examples 1, 4, 7, 8, 9, 10, 11, 12 and 14, using 70 parts of the emulsion clear, 24.5 parts of the dye solution and finally adding 1.5 parts of 50% ammonium thiocyanate solution and 4 parts of a solution of sodium chromate.

The colored emulsions were printed on to cellulose fibers both by roller and screen printing methods, dried, aged 5 minutes at 103° C. at a neutral pH, rinsed in warm water, soaped for 5 minutes at 100° C., again rinsed and dried. An excellent print was obtained in each case, having the high fastness of vat dye.

The above procedure was repeated, using acid ageing at 103° C. with fumes of formic or acetic acid. Thereupon the material was rinsed, soaped, rinsed and dried as described in conjunction with the neutral ageing procedure. The prints showed the same high quality.

*Example 40*

Colored emulsions were prepared as in the preceding example using the following dyes:

Prototype No. 9
C.I. No. 1184
C.I. No. 1217
Sulfuric acid half ester of 6,6'-dichloro-4,4'-dimethyl-2,2'-bis-thionaphthene indigo Excellent prints were obtained having the high fastness of the vat dye in question. When it was attempted to use emulsion clears prepared with lignin sulfonates, the colored products were thick and grainy and could not be printed.

REACTIVE DYES

To demonstrate the utility of the emulsions of this invention with reactive dyes, the following illustrative examples are typical.

*Examples 41*

A creamy-white emulsion vehicle is prepared by dissolving 20 parts of a commercial bodying agent (Keltex—Kelco Company) in 545 parts of water with slow stirring, then using a high-speed stirrer (Eppenbach-type) adding 10 parts of N-octadecyl-N-disodium-succino-disodium sulfosuccinamate and then 425 parts of Varsol No. 1.

A colored printing emulsion is prepared by dissolving 5 parts of dyestuff in 24 parts of water containing 20 parts of dissolved urea, with high-speed stirring adding resultant solution to 50 parts of the emulsion vehicle and adding thereto one part of sodium bicarbonate.

Using the resultant colored composition, prints are made on cotton fabric, dried, aged for 10 minutes in a neutral-steam ager, rinsing for three minutes with cold water, rinsing three minutes with water at 140° F., scouring for 5 minutes at 180° F. in a 0.1% aqueous solution of sodium oleyl taurine containing 0.05% sodium carbonate, followed by final rinsing and drying.

Using a dyestuff of the formula

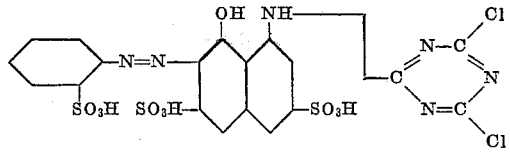

excellent reddish shade prints are obtained. Fastness to light and washing is good.

Repeating the procedure produces excellent prints with twenty-eight different dyes of this type. Equally good prints are obtained using a different emulsion-type vehicle made by the above procedure but using only 540 parts of water and substituting 25 parts of high-viscosity carboxymethyl cellulose for the 20 parts of sodium alginate (Keltex).

I claim:

1. A stable, creamy-white oil-in-water type emulsion suitable for use as a vehicle in the coloring of fibrous materials, said emulsion having (a) an inner disperse phase comprising an inert liquid hydrocarbon in an amount of from about 15 to about 80 weight percent of the total weight, said hydrocarbon having the upper limit of its boiling range between about 300° and about 400° C., and (b) an outer phase comprising water and an amide of sulfosuccinic acid having the following formula

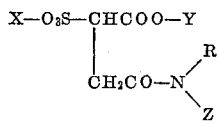

wherein X and Y are cations selected from hydrogen and salt-forming radicals, R is selected from the alkyl, hydroxyalkyl and alkoxyalkyl radicals of from about 12 to about 20 carbon atoms, and Z is selected from hydrogen and

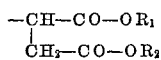

wherein $R_1$ and $R_2$ are selected from hydrogen and alkyl and hydroxyalkyl groups containing from about one to about six carbon atoms, the total number of carbon atoms in $R+R_1+R_2$ being in the range from about 16, when $R_1$ and $R_2$ are hydrogen, to about 30 when $R_1$ and $R_2$ contain carbon atoms, said amide comprising from about 0.4 to about 2.0 weight percent of the total weight.

2. An oil-in-water type emulsion vehicle according to claim 1 wherein said outer phase comprises water and a higher alkyl monoamide of sulfosuccinic acid, the alkyl group containing from about 12 to about 20 carbon atoms.

3. An oil-in-water type emulsion vehicle according to claim 1 wherein said outer phase comprises water and a compound having the formula

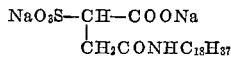

4. An oil-in-water type emulsion vehicle according to claim 1 wherein said outer phase comprises water and a dodecyl monoamide of sulfosuccinic acid.

5. A stable, dyestuff-containing, oil-in-water type emulsion for use in coloring of fibrous materials, said emulsion having (a) an inner disperse phase comprising a liquid hydrocarbon in an amount of from about 15 to about 80 weight percent of the emulsion, said hydrocarbon having the upper limit of its boiling range between about 300° and about 400° C., and (b) an outer phase comprising water and an amide of sulfosuccinic acid having the following formula

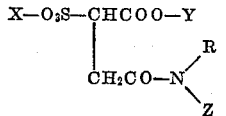

wherein X and Y are cations selected from hydrogen and salt-forming radicals, R is selected from the alkyl, hydroxyalkyl and alkoxyalkyl radicals of from about 12 to about 20 carbon atoms, and Z is selected from hydrogen and

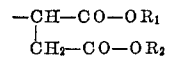

wherein $R_1$ and $R_2$ are selected from hydrogen and alkyl and hydroxyalkyl groups containing from about one to about six carbon atoms, the total number of carbon atoms in $R+R_1+R_2$ being in the range from about 16, when $R_1$ and $R_2$ are hydrogen, to about 30 when $R_1$ and $R_2$ contain carbon atoms and having said dyestuffs dispersed therein.

6. A stable, oil-in-water type emulsion according to claim 5 in which said dyestuff is selected from developable dyes, vat dyes, direct dyes, azoic coloring matter when all components which react to form the dye are present, disperse dyes, acid dyes and basic dyes.

7. A stable, oil-in-water type emulsion according to claim 5 wherein said outer-phase comprises water and a higher alkyl monoamide of sulfosuccinic acid and has said dyestuffs dispersed therein.

8. An emulsion according to claim 7 in which said dyestuff is selected from developable dyes, vat dyes, direct dyes, azoic coloring matter when all components which react to form the dye are present, disperse dyes, acid dyes and basic dyes.

9. A stable, oil-in-water type emulsion according to claim 5 wherein said outer phase comprises water and a dodecyl monoamide of sulfosuccinic acid and has said dyestuff dissolved therein.

10. An emulsion according to claim 9 in which said dyestuff is selected from developable dyes, vat dyes, direct dyes, azoic coloring matter when all components which react to form the dye are present, disperse dyes, acid dyes and basic dyes.

11. A stable, oil-in-water type emulsion according to claim 5 wherein said outer phase comprises water and a compound having the formula

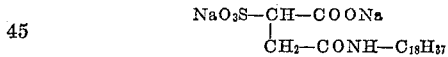

and has said dyestuff dispersed therein.

12. An emulsion according to claim 11 in which said dyestuff is selected from developable dyes, vat dyes, direct dyes, azoic coloring matter when all components which react to form the dye are present, disperse dyes, acid dyes and basic dyes.

References Cited in the file of this patent

UNITED STATES PATENTS

| | | |
|---|---|---|
| 2,252,401 | Jaeger | Aug. 12, 1941 |
| 2,332,121 | Trowell | Oct. 19, 1943 |
| 2,383,130 | Jaeger | Aug. 21, 1945 |
| 2,438,092 | Lynch | Mar. 16, 1948 |
| 2,597,281 | Borstelmann | May 20, 1952 |

OTHER REFERENCES

Sisley et al.: Encyclopedia of Surface Active Agents, Chem. Pub. Co. Inc., N.Y., 1952, pp. 66, 206.

Schwartz et al.: Surface Active Agents, Vol. 1, Intersci. Pub. Inc., N.Y., 1949, page 106.